(12) United States Patent
Jeon

(10) Patent No.: US 11,625,125 B2
(45) Date of Patent: Apr. 11, 2023

(54) DISPLAY APPARATUS AND METHOD OF DETECTING DROPOUT OF STABILIZATION CAPACITOR OF TOUCH DRIVER USING THE SAME

(71) Applicant: Samsung Display Co., Ltd., Yongin-si (KR)

(72) Inventor: Jinyoung Jeon, Gumi-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 104 days.

(21) Appl. No.: 17/365,477

(22) Filed: Jul. 1, 2021

(65) Prior Publication Data

US 2022/0075475 A1 Mar. 10, 2022

(30) Foreign Application Priority Data

Sep. 10, 2020 (KR) .................. 10-2020-0116194

(51) Int. Cl.
*G06F 3/041* (2006.01)
(52) U.S. Cl.
CPC ........ *G06F 3/0418* (2013.01); *G06F 3/04164* (2019.05)

(58) Field of Classification Search
CPC .......................... G06F 3/0418; G06F 3/04164
USPC .......................................................... 345/156
See application file for complete search history.

(56) References Cited

U.S. PATENT DOCUMENTS

2021/0109148 A1* 4/2021 di Martino ......... G01R 31/2601

FOREIGN PATENT DOCUMENTS

KR 10-2019-0054693 A 5/2019

* cited by examiner

*Primary Examiner* — Mark Edwards
(74) *Attorney, Agent, or Firm* — Lewis Roca Rothgerber Christie LLP

(57) ABSTRACT

A display apparatus includes: a display panel configured to display an image; a data driver configured to output a data voltage to a data line of the display panel; a touch driver configured to identify a touch input to the display panel; a power voltage generator configured to generate a touch power voltage; and a mixer configured to mix a periodical signal to the touch power voltage to generate a mixing signal and configured to provide the mixing signal to the touch driver in a test mode.

19 Claims, 8 Drawing Sheets

DISPLAY APPARATUS AND METHOD OF DETECTING DROPOUT OF STABILIZATION CAPACITOR OF TOUCH DRIVER USING THE SAME

CROSS-REFERENCE TO RELATED APPLICATION

The present application claims priority to and the benefit of Korean Patent Application No. 10-2020-0116194, filed on Sep. 10, 2020 in the Korean Intellectual Property Office KIPO, the entire content of which is incorporated herein by reference.

BACKGROUND

1. Field

Aspects of some embodiments of the present inventive concept relate to a display apparatus and a method of detecting a dropout of a stabilization capacitor of a touch driver using the display apparatus.

2. Description of the Related Art

Generally, a display apparatus includes a display panel and a display panel driver. The display panel includes a plurality of gate lines and a plurality of data lines. The display panel driver includes a gate driver and a data driver. The gate driver outputs gate signals to the gate lines. The data driver outputs data voltages to the data lines. The display panel may include a touch function. The display apparatus may further include a touch driver to operate the touch function (e.g., to sense or identify touch inputs from the user).

In addition, the display apparatus may further include a power voltage generator generating a power voltage to drive the gate driver, the data driver and the touch driver and outputting the power voltage to the gate driver, the data driver and the touch driver.

To remove an AC component of the touch power voltage applied to the touch driver, the touch driver may include a stabilization capacitor. The dropout of the stabilization capacitor in a manufacturing step and a conveying step may not be detected well only by visual inspection.

When an external noise is applied to electrically detect the dropout of the stabilization capacitor of the touch driver, the external noise may not be applied well because a driving board itself may also have a stabilization capacitor.

The above information disclosed in this Background section is only for enhancement of understanding of the background and therefore the information discussed in this Background section does not necessarily constitute prior art.

SUMMARY

Aspects of some embodiments of the present inventive concept relate to a display apparatus and a method of detecting a dropout of a stabilization capacitor of a touch driver using the display apparatus. For example, aspects of some embodiments of the present inventive concept relate to a display apparatus capable of detecting a drop of a stabilization capacitor of a touch driver using a mixing signal generated by mixing a periodic signal to a touch power voltage and a method of detecting a dropout of a stabilization capacitor of a touch driver using the display apparatus.

Aspects of some embodiments of the present inventive concept include a display apparatus capable of detecting a drop of a stabilization capacitor of a touch driver using a mixing signal generated by mixing a periodic signal to a touch power voltage.

Aspects of some embodiments of the present inventive concept also provide a method of detecting a dropout of a stabilization capacitor of a touch driver using the display apparatus.

According to some embodiments of the present inventive concept, a display apparatus includes a display panel, a data driver, a touch driver, a power voltage generator and a mixer. The display panel is configured to display an image. The data driver is configured to output a data voltage to a data line of the display panel. The touch driver is configured to recognize a touch of the display panel. The power voltage generator is configured to generate a touch power voltage. The mixer is configured to mix a periodical signal to the touch power voltage to generate a mixing signal. The mixer is configured to provide the mixing signal to the touch driver in a test mode.

According to some embodiments, the touch driver may be configured to receive a touch power voltage in a normal mode.

According to some embodiments, the display apparatus may further include a first switch including a first end configured to receive the touch power voltage and a second end connected to an output node of the mixer, a second switch including a first end configured to receive the touch power voltage and a second end connected to a first input terminal of the mixer, a third switch including a first end configured to receive the periodical signal and a second end connected to a second input terminal of the mixer, a first pull up resistor including a first end connected to the output node of the mixer and a second end connected to the touch driver and a stabilization capacitor including a first end connected to the output node of the mixer and a second end connected to a ground.

According to some embodiments, a first switch signal applied to the first switch may have an active level and a second switch signal applied to the second switch and a third switch signal applied to the third switch may have an inactive level in a turn on period of the normal mode.

According to some embodiments, a first switch signal applied to the first switch may have an inactive level and a second switch signal applied to the second switch and a third switch signal applied to the third switch may have an active level in a test period of the test mode.

According to some embodiments, the periodical signal may be a vertical synchronization signal corresponding to a start point of a frame of the image. The vertical synchronization signal may be outputted from the data driver to the mixer.

According to some embodiments, the data driver may be configured output a vertical synchronization enable signal representing an activation of the vertical synchronization signal to the touch driver.

According to some embodiments, when an input frequency of the image is a first frequency, the periodical signal may be a second vertical synchronization signal has a second frequency less than the first frequency. The second vertical synchronization signal may be outputted from the data driver to the mixer.

According to some embodiments, the periodical signal may be a horizontal synchronization signal corresponding to a horizontal period of the image. The horizontal synchronization signal may be outputted from the data driver to the mixer.

According to some embodiments, the display apparatus may further include a gate driver configured to apply a gate signal to a gate line of the display panel and a driving controller configured to control a timing of the gate driver and a timing of the data driver. The periodical signal may be a vertical start signal representing a start of a scanning of the gate driver. The vertical start signal may be outputted from the driving controller to the mixer.

According to some embodiments, the display apparatus may further include a gate driver configured to apply a gate signal to a gate line of the display panel and a driving controller configured to control a timing of the gate driver and a timing of the data driver. The data driver and the driving controller may be integrally formed to form an integrated driver. The periodical signal may be a vertical synchronization signal corresponding to a start point of a frame of the image. The vertical synchronization signal may be outputted from the integrated driver to the mixer.

According to some embodiments of the present disclosure, in a method of detecting a dropout of a stabilization capacitor of a touch driver, the method includes generating a touch power voltage, mixing a periodical signal to the touch power voltage to generate a mixing signal, providing the mixing signal to the touch driver in a test mode and detecting the dropout of the stabilization capacitor of the touch driver based on an input mixing signal which is the mixing signal after inputted into the touch driver.

According to some embodiments, when the input mixing signal has periodical signal component, the stabilization capacitor of the touch driver may be determined to be dropped out. When the input mixing signal does not have the periodical signal component, the stabilization capacitor of the touch driver may be determined not to be dropped out.

According to some embodiments, the touch driver may be configured to receive the touch power voltage in a normal mode.

According to some embodiments, a peripheral circuit of the touch driver may include a first switch including a first end configured to receive the touch power voltage and a second end connected to an output node of a mixer, a second switch including a first end configured to receive the touch power voltage and a second end connected to a first input terminal of the mixer, a third switch including a first end configured to receive the periodical signal and a second end connected to a second input terminal of the mixer, a first pull up resistor including a first end connected to the output node of the mixer and a second end connected to the touch driver and a stabilization capacitor including a first end connected to the output node of the mixer and a second end connected to a ground.

According to some embodiments, a first switch signal applied to the first switch may have an active level and a second switch signal applied to the second switch and a third switch signal applied to the third switch may have an inactive level in a turn on period of the normal mode.

According to some embodiments, a first switch signal applied to the first switch may have an inactive level and a second switch signal applied to the second switch and a third switch signal applied to the third switch may have an active level in a test period of the test mode.

According to some embodiments, the periodical signal may be a vertical synchronization signal corresponding to a start point of a frame of an image. The vertical synchronization signal may be outputted from a data driver to a mixer.

According to some embodiments, the periodical signal may be a horizontal synchronization signal corresponding to a horizontal period of an image. The horizontal synchronization signal may be outputted from a data driver to a mixer.

According to the display apparatus and the method of detecting the dropout of the stabilization capacitor of the touch driver using the display apparatus, the dropout of the stabilization capacitor of the touch driver may be detected using the mixing signal generated by mixing the periodic signal to the touch power voltage. The dropout of the stabilization capacitor of the touch driver may be electrically detected so that the detectability may be significantly increased compared to visually or manually inspecting the dropout of the stabilization capacitor.

In addition, the periodic signal in the display apparatus may be used to detect the dropout of the stabilization capacitor without additional noise generating apparatus or equipment so that the dropout of the stabilization capacitor of the touch driver may be detected without increasing the manufacturing cost of the display apparatus.

BRIEF DESCRIPTION OF THE DRAWINGS

The above and other features and characteristics of embodiments according to the present inventive concept will become more apparent by describing in more detail aspects of some embodiments thereof with reference to the accompanying drawings, in which.

DETAILED DESCRIPTION

Hereinafter, aspects of some embodiments of the present inventive concept will be explained in more detail with reference to the accompanying drawings.

Figure 1:
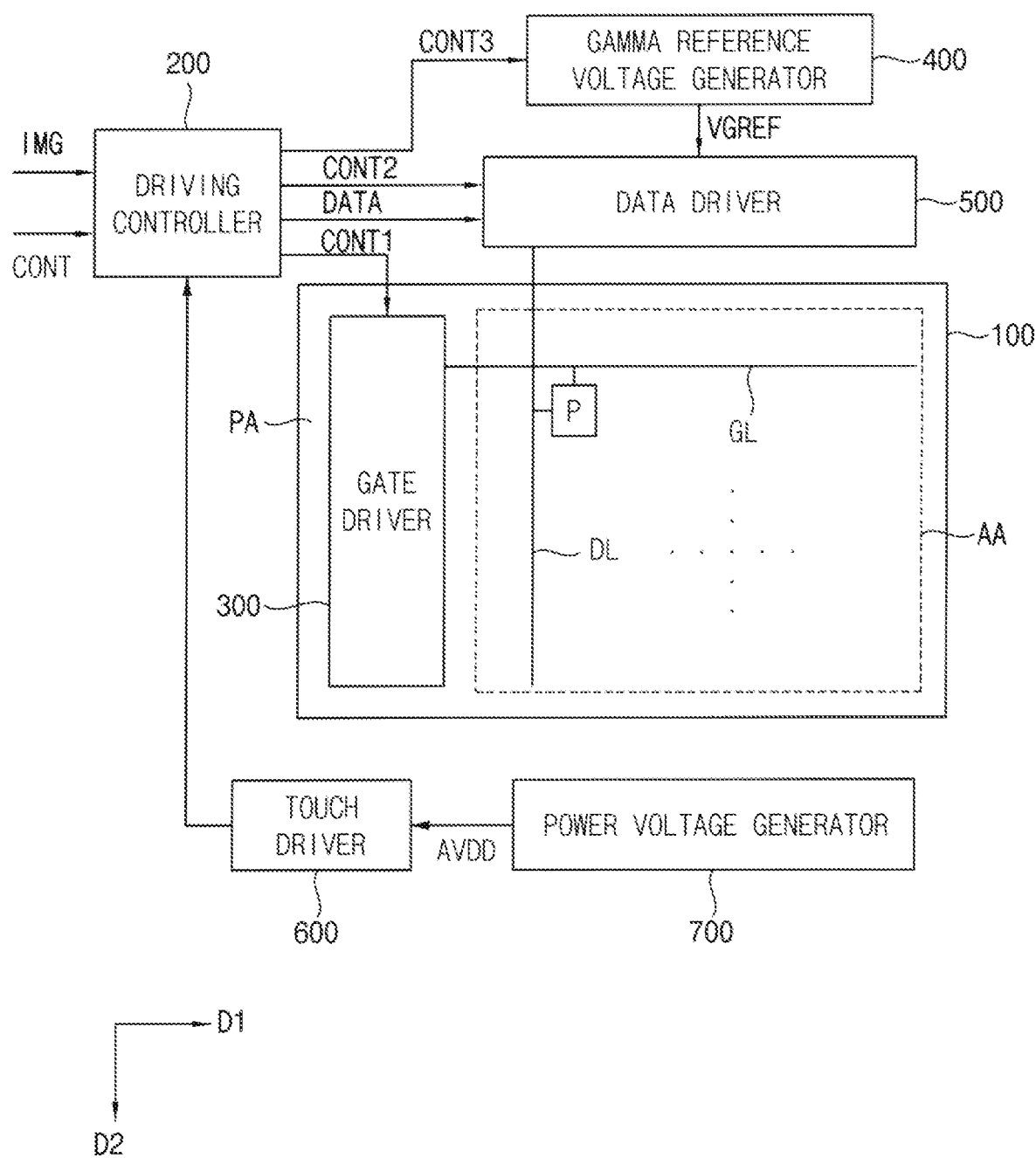
FIG. 1 is a block diagram illustrating a display apparatus according to some embodiments of the present inventive concept.

FIG. 1 is a block diagram illustrating a display apparatus according to some embodiments of the present inventive concept.

Referring to FIG. 1, the display apparatus includes a display panel 100 and a display panel driver. The display panel driver includes a driving controller 200, a gate driver 300, a gamma reference voltage generator 400 and a data driver 500.

For example, according to some embodiments the driving controller 200 and the data driver 500 may be integrally formed (e.g., as an integrated component). For example, the driving controller 200, the gamma reference voltage generator 400 and the data driver 500 may be integrally formed. A driving module including at least the driving controller 200 and the data driver 500 which are integrally formed may be called to a timing controller embedded data driver (TED) or an integrated driver.

The display panel 100 has a display region AA at which images are displayed and a peripheral region PA adjacent to the display region AA at which images are not displayed.

The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL.

According to some embodiments, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

According to some embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

According to some embodiments, the display panel 100 may include a touch function. The display panel 100 may include a display substrate and a touch substrate. Alternatively, the display substrate and the touch substrate may be integrated. The display apparatus may further include a touch driver 600 to recognize a touch of the display panel 100.

The display apparatus may further include a power voltage generator 700 generating a touch power voltage AVDD of the touch driver 600.

The power voltage generator 700 may generate a power voltage for the display panel 100 and the display panel driver in addition to the touch power voltage AVDD. For example, the power voltage generator 700 may output a pixel power voltage to a pixel circuit of the display panel 100. For example, the power voltage generator 700 may generate a gate on voltage and a gate off voltage of the gate driver 300. For example, the power voltage generator 700 may generate a data power voltage of the data driver 500.

Figure 2:
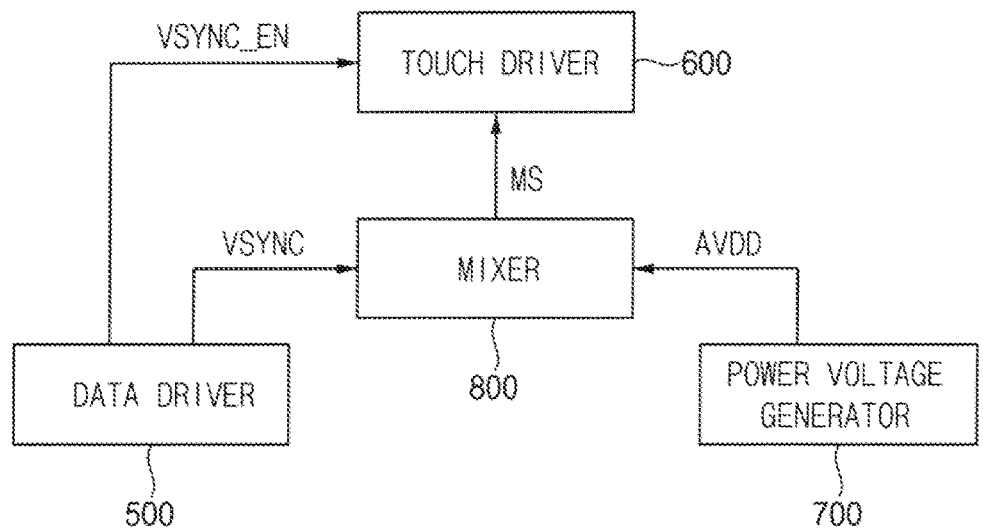
FIG. 2 is a block diagram illustrating operations of a data driver, a touch driver, a power voltage generator and a mixer of FIG. 1 according to some embodiments of the present inventive concept.
Figure 3:
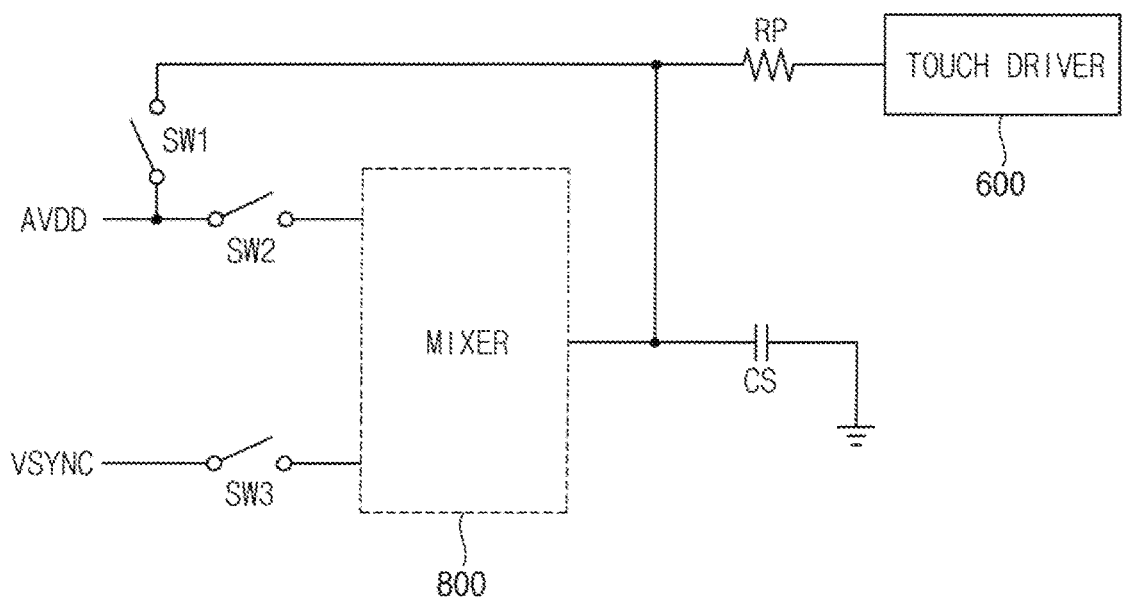
FIG. 3 is a circuit diagram illustrating operations of the mixer and the touch driver of FIG. 2 according to some embodiments of the present inventive concept.
Figure 4:
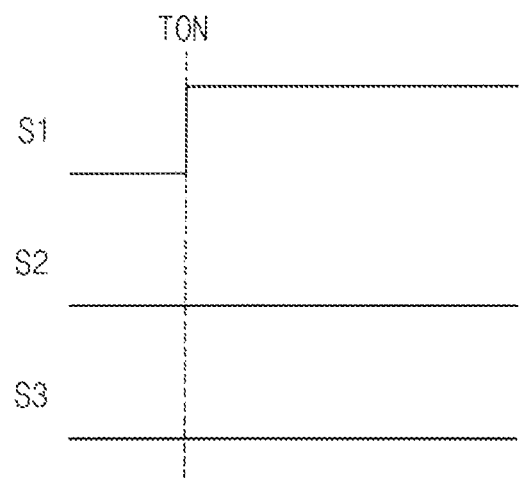
FIG. 4 is a timing diagram illustrating first, second and third switching signals applied to first, second and third switches of FIG. 3 in a first mode according to some embodiments of the present inventive concept.
Figure 5:
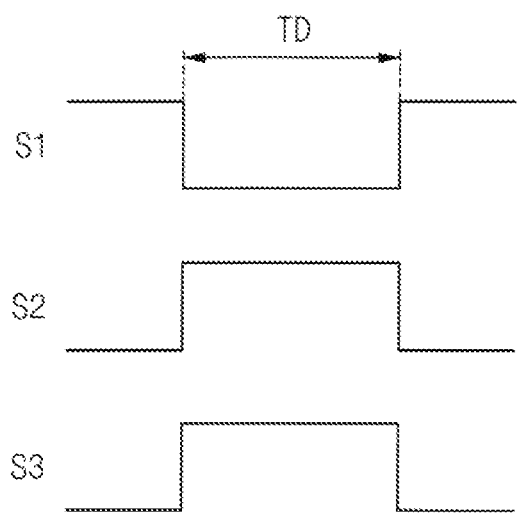
FIG. 5 is a timing diagram illustrating first, second and third switching signals applied to the first, second and third switches of FIG. 3 in a second mode according to some embodiments of the present inventive concept.

FIG. 2 is a block diagram illustrating operations of the data driver 500, the touch driver 600, the power voltage generator 700 and a mixer 800 of FIG. 1. FIG. 3 is a circuit diagram illustrating operations of the mixer 800 and the touch driver 600 of FIG. 2. FIG. 4 is a timing diagram illustrating first, second and third switching signals S1, S2 and S3 applied to first, second and third switches SW1, SW2 and SW3 of FIG. 3 in a first mode. FIG. 5 is a timing diagram illustrating first, second and third switching signals S1, S2 and S3 applied to the first, second and third switches SW1, SW2 and SW3 of FIG. 3 in a second mode.

Referring to FIGS. 1 to 5, the display apparatus may further include the mixer 800 mixing the touch power voltage AVDD and a periodical signal (e.g., VSYNC) to generate a mixing signal MS in a test mode (the second mode) and outputting the mixing signal MS to the touch driver 600.

In a normal mode (the first mode), the touch driver 600 may receive the touch power voltage AVDD.

In the test mode, a dropout of a stabilization capacitor of the touch driver 600 which is connected to the touch driver 600 in parallel may be electrically detected. In the normal mode, the touch driver 600 may recognize a touch of the display panel 100.

As shown in FIG. 3, a peripheral circuit of the touch driver 600 may include a first switch SW1 including a first end receiving the touch power voltage AVDD and a second end connected to an output node of the mixer 800, a second switch SW2 including a first end receiving the touch power voltage AVDD and a second end connected to a first input terminal of the mixer 800, a third switch SW3 including a first end receiving the periodical signal (e.g., VSYNC) and a second end connected to a second input terminal of the mixer 800, a first pull up resistor RP including a first end connected to the output node of the mixer 800 and a second end connected to the touch driver 600 and the stabilization capacitor CS including a first end connected to the output node of the mixer 800 and a second end connected to a ground.

The pull up resistor RP may be a load resistor for the touch driver 600 to receive the touch power voltage AVDD or the mixing signal MS. The stabilization capacitor CS may remove a noise component (e.g., an AC component) which may be included in the touch power voltage AVDD applied to the touch driver 600. Although the pull up resistor RP and the stabilization capacitor CS are located outside the touch driver 600 in FIG. 3, but embodiments according to the present inventive concept may not be limited thereto. For example, the pull up resistor RP and the stabilization capacitor CS may be included in the touch driver 600.

Thus, when the stabilization capacitor CS is not dropped out and the touch power voltage AVDD including the noise component is applied to the touch driver 600, the touch power voltage AVDD from which the noise component is removed may be inputted into the touch driver 600. In contrast, when the stabilization capacitor CS is dropped out and the touch power voltage AVDD including the noise component is applied to the touch driver 600, the touch power voltage AVDD including the noise component may be inputted into the touch driver 600.

As shown in FIG. 4, a first switch signal S1 applied to the first switch SW1 may have an active level and a second switch signal S2 applied to the second switch SW2 and a third switch signal S3 applied to the third switch SW3 may have an inactive level in a turn on period TON when the touch driver 600 normally operate in the normal mode. For example, the active level may be a high level and the inactive level may be a low level in FIG. 4.

In the turn on period TON of the normal mode, the touch power voltage AVDD may be applied to the touch driver 600 through the pull up resistor RP but not through the mixer 800.

As shown in FIG. 5, the first switch signal S1 may have an inactive level and the second switch signal S2 and the third switch signal S3 may have an active level in a test period TD when the dropout of the stabilization capacitor CS is inspected in the test mode. For example, the active level may be a high level and the inactive level may be a low level in FIG. 5.

In the test period TD of the test mode, the touch power voltage AVDD may be mixed with the periodical signal VSYNC by the mixer 800 and the mixing signal MS may be applied to the touch driver 600 through the pull up resistor RP.

According to some embodiments, the periodical signal may be a vertical synchronization signal VSYNC corresponding to a start point of a frame of an image. The vertical synchronization signal VSYNC may be outputted from the data driver 500 to the mixer 800. For example, the vertical synchronization signal VSYNC may be generated by the driving controller 200 and may be outputted from the driving controller 200 to the data driver 500 with the data signal DATA. When an input frequency of the input image data IMG is 60 Hz, the vertical synchronization signal VSYNC may have a frequency of 60 Hz.

The data driver 500 may output a vertical synchronization enable signal VSYNC_EN representing an activation of the vertical synchronization signal VSYNC to the touch driver 600.

Figure 6:
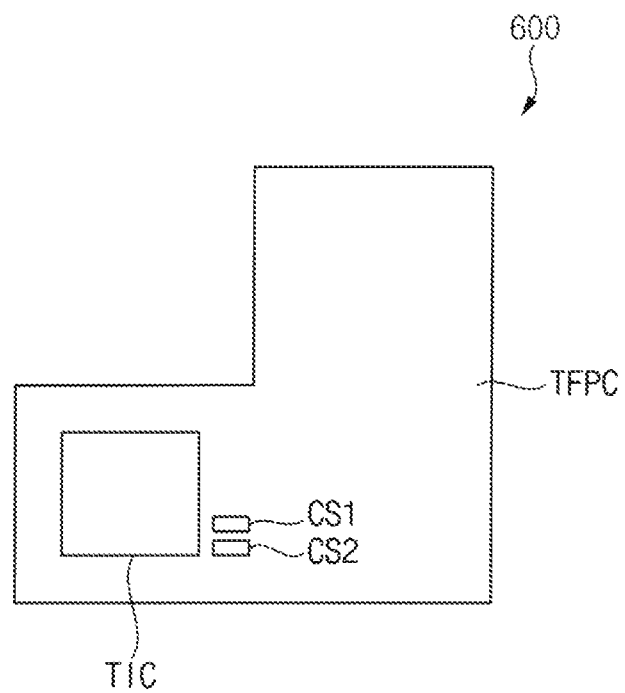
FIG. 6 is a plan view illustrating the touch driver of FIG. 1 of which a stabilization capacitor is not dropped out according to some embodiments of the present inventive concept.
Figure 7:
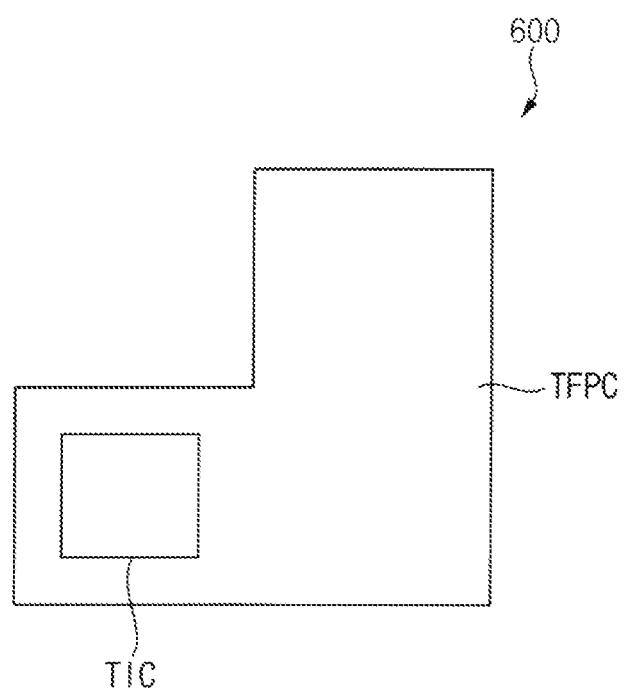
FIG. 7 is a plan view illustrating the touch driver of FIG. 1 of which the stabilization capacitor is dropped out according to some embodiments of the present inventive concept.
Figure 8:
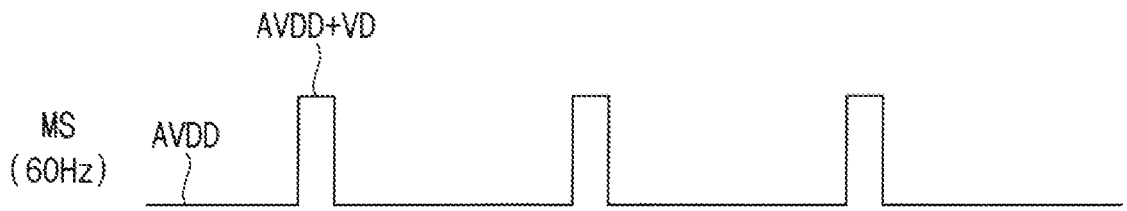
FIG. 8 is a timing diagram illustrating a mixing signal generated by the mixer of FIG. 2 according to some embodiments of the present inventive concept.
Figure 9:
FIG. 9 is a timing diagram illustrating an input mixing signal inputted into the touch driver of FIG. 1 when the stabilization capacitor is not dropped out according to some embodiments of the present inventive concept.
Figure 10:
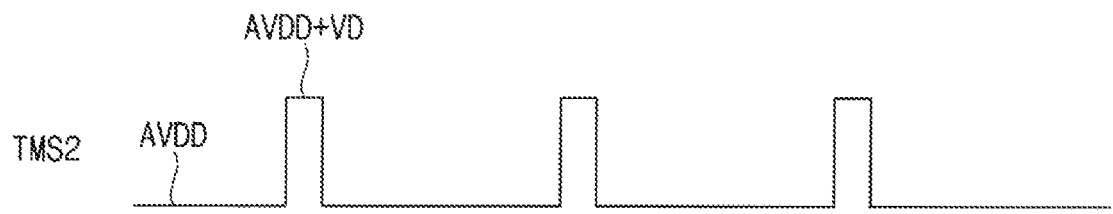
FIG. 10 is a timing diagram illustrating the input mixing signal inputted into the touch driver of FIG. 1 when the stabilization capacitor is dropped out according to some embodiments of the present inventive concept.

FIG. 6 is a plan view illustrating the touch driver 600 of FIG. 1 of which the stabilization capacitor (e.g., CS1 and CS2) is not dropped out. FIG. 7 is a plan view illustrating the touch driver 600 of FIG. 1 of which the stabilization capacitor (e.g., CS1 and CS2) is dropped out. FIG. 8 is a timing diagram illustrating the mixing signal MS generated by the mixer 800 of FIG. 2. FIG. 9 is a timing diagram illustrating an input mixing signal TMS1 inputted into the touch driver 600 of FIG. 1 when the stabilization capacitor (e.g., CS1 and CS2) is not dropped out. FIG. 10 is a timing diagram illustrating the input mixing signal TMS2 inputted into the touch driver 600 of FIG. 1 when the stabilization capacitor (e.g., CS1 and CS2) is dropped out.

Referring to FIGS. 1 to 10, for example, the touch driver 600 may include a touch driving chip TIC, the stabilization capacitor (e.g., CS1 and CS2) located adjacent to the touch driving chip TIC and removing a noise component of the touch power voltage AVDD applied to the touch driving chip TIC and a flexible printed circuit TFPC on which the stabilization capacitor (e.g., CS1 and CS2) is mounted.

FIG. 6 illustrates a case in which the stabilization capacitor (e.g., CS1 and CS2) is not dropped out. FIG. 7 illustrates a case in which the stabilization capacitor (e.g., CS1 and CS2) is dropped out.

The mixing signal MS generated by mixing the touch power voltage AVDD and the periodical signal (e.g., VSYNC) are mixed may have a waveform of FIG. 8. The mixing signal MS may be applied to the touch driving chip TIC. When the vertical synchronization signal VSYNC has the frequency of 60 Hz, the mixing signal MS may have a frequency of 60 Hz. When a high level voltage of the vertical synchronization signal VSYNC is VD and a low level voltage of the vertical synchronization signal VSYNC is 0, the mixing signal MS may have a level of AVDD+VD corresponding to the high level of the vertical synchronization signal VSYNC and a level of AVDD corresponding to the low level of the vertical synchronization signal VSYNC.

As shown in FIG. 9, when the stabilization capacitor (e.g., CS1 and CS2) of the touch driver 600 is not dropped out, a periodical signal component of the mixing signal MS may be removed by the stabilization capacitor (e.g., CS1 and CS2). Thus, when the stabilization capacitor (e.g., CS1 and CS2) of the touch driver 600 is not dropped out, an input mixing signal TMS1 representing the mixing signal MS after inputted into the touch driver 600 may not have the periodical signal component.

In contrast, as shown in FIG. 9, when the stabilization capacitor (e.g., CS1 and CS2) of the touch driver 600 is dropped out, the periodical signal component of the mixing signal MS may not be removed. Thus, when the stabilization capacitor (e.g., CS1 and CS2) of the touch driver 600 is dropped out, an input mixing signal TMS2 representing the mixing signal MS after inputted into the touch driver 600 may have the periodical signal component.

A user or a manufacture may electrically detect the dropout of the stabilization capacitor (e.g., CS1 and CS2) of the touch driver 600 based on the input mixing signal TMS1 and TMS2 representing the mixing signal MS after inputted into the touch driver 600. When the input mixing signal (e.g., TMS2) has the periodical signal component, it may be determined that the stabilization capacitor (e.g., CS1 and CS2) of the touch driver 600 is dropped out. When the input mixing signal (e.g., TMS2) does not have the periodical signal component, it may be determined that the stabilization capacitor (e.g., CS1 and CS2) of the touch driver 600 is not dropped out.

According to some embodiments, the dropout of the stabilization capacitor (e.g., CS or CS1 and CS2) of the touch driver 600 may be detected using the mixing signal MS generated by mixing the periodic signal (e.g., VSYNC) to the touch power voltage AVDD. The dropout of the stabilization capacitor (e.g., CS or CS1 and CS2) of the touch driver 600 may be electrically detected so that the detectability may be significantly increased compared to visually inspecting the dropout of the stabilization capacitor (e.g., CS or CS1 and CS2).

In addition, the periodic signal (e.g., VSYNC) in the display apparatus is used to detect the dropout of the stabilization capacitor without additional noise generating apparatus or equipment so that the dropout of the stabilization capacitor (e.g., CS or CS1 and CS2) of the touch driver 600 may be detected without increasing the manufacturing cost of the display apparatus.

Figure 11:
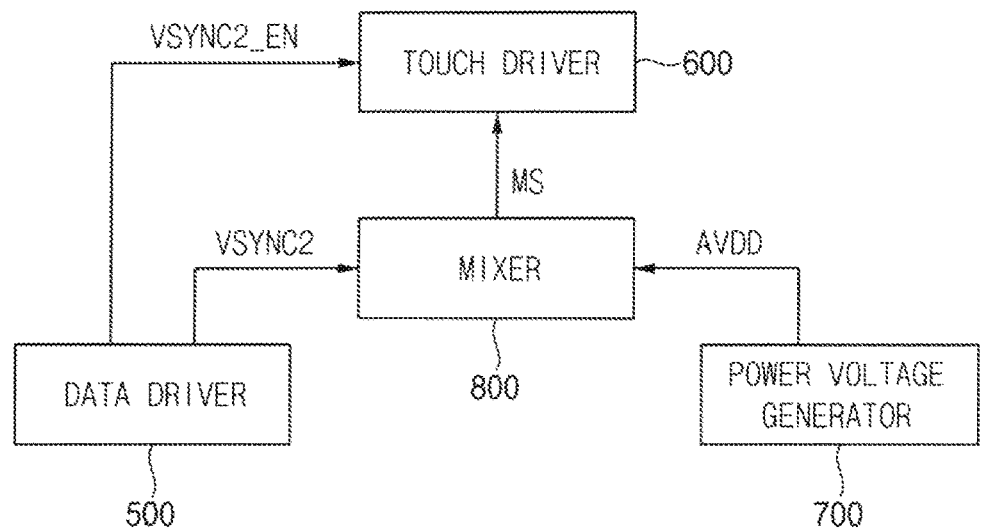
FIG. 11 is a block diagram illustrating operations of a data driver, a touch driver, a power voltage generator and a mixer of a display apparatus according to some embodiments of the present inventive concept.
Figure 12:
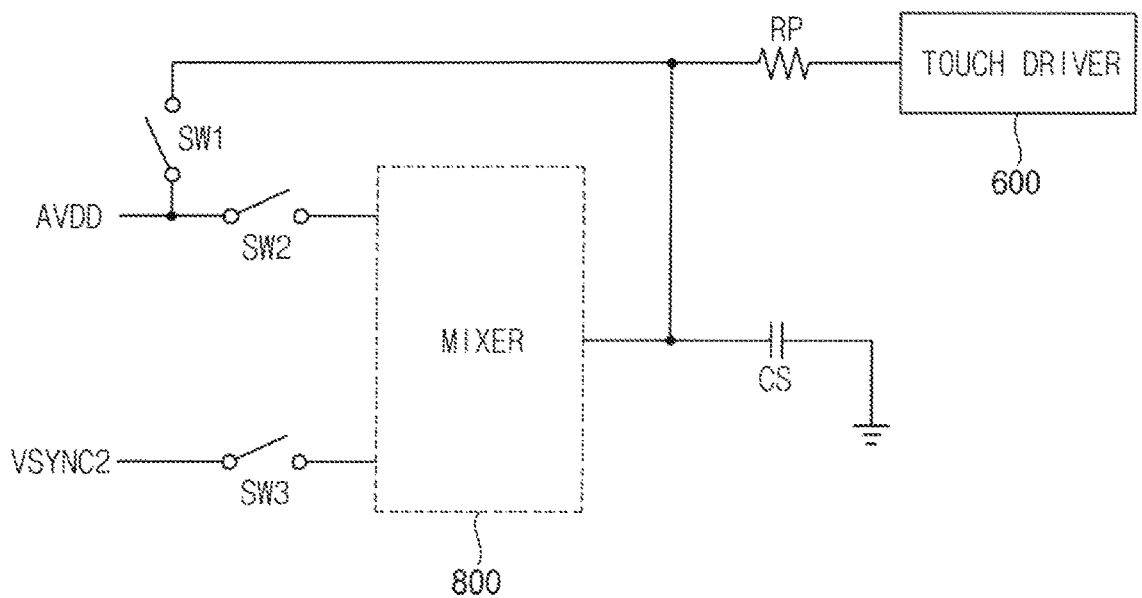
FIG. 12 is a circuit diagram illustrating operations of the mixer and the touch driver of FIG. 11 according to some embodiments of the present inventive concept.

FIG. 11 is a block diagram illustrating operations of a data driver 500, a touch driver 600, a power voltage generator 700 and a mixer 800 of a display apparatus according to some embodiments of the present inventive concept. FIG. 12 is a circuit diagram illustrating operations of the mixer 800 and the touch driver 600 of FIG. 11.

The display apparatus according to some embodiments as illustrated in FIG. 11 may be substantially the same as the display apparatus of the previous example embodiments described with respect to FIGS. 1 to 10 except for the periodical signal. Thus, the same reference numerals will be used to refer to the same or like parts as those described in the previous example embodiments described with respect to FIGS. 1 to 10 and some repetitive explanation concerning the above elements may be omitted.

Referring to FIGS. 1 and 4 to 12, the display apparatus includes a display panel 100 and a display panel driver. The display panel driver includes a driving controller 200, a gate driver 300, a gamma reference voltage generator 400 and a data driver 500.

The display apparatus may further include a touch driver 600 to recognize a touch of the display panel 100. The display apparatus may further include a power voltage generator 700 generating a touch power voltage AVDD of the touch driver 600.

The display apparatus may further include a mixer 800 mixing the touch power voltage AVDD and a periodical signal (e.g., VSYNC2) to generate a mixing signal MS in a test mode (the second mode) and outputting the mixing signal MS to the touch driver 600.

In a normal mode (the first mode), the touch driver 600 may receive the touch power voltage AVDD.

As shown in FIG. 12, a peripheral circuit of the touch driver 600 may include a first switch SW1 including a first end receiving the touch power voltage AVDD and a second end connected to an output node of the mixer 800, a second switch SW2 including a first end receiving the touch power voltage AVDD and a second end connected to a first input terminal of the mixer 800, a third switch SW3 including a first end receiving the periodical signal (e.g., VSYNC2) and a second end connected to a second input terminal of the mixer 800, a first pull up resistor RP including a first end connected to the output node of the mixer 800 and a second end connected to the touch driver 600 and the stabilization capacitor CS including a first end connected to the output node of the mixer 800 and a second end connected to a ground.

When the stabilization capacitor CS is not dropped out and the touch power voltage AVDD including the noise component is applied to the touch driver 600, the touch power voltage AVDD from which the noise component is removed may be inputted into the touch driver 600. In contrast, when the stabilization capacitor CS is dropped out and the touch power voltage AVDD including the noise component is applied to the touch driver 600, the touch power voltage AVDD including the noise component may be inputted into the touch driver 600.

According to some embodiments, the periodical signal may be a second vertical synchronization signal VSYNC2 corresponding to a start point of a frame of an output image. The second vertical synchronization signal VSYNC2 may be outputted from the data driver 500 to the mixer 800. For example, the second vertical synchronization signal VSYNC2 may be generated by the driving controller 200 and may be outputted from the driving controller 200 to the data driver 500 with the data signal DATA. The second vertical synchronization signal VSYNC2 may have a frequency less than an input frequency of the input image data IMG. The second vertical synchronization signal VSYNC2 may be a vertical synchronization signal used in a hybrid low power mode. For example, the frequency of the second vertical synchronization signal VSYNC2 may be an output frequency of the output image decreased than the input frequency of the input image data IMG to decrease a consumption of a battery of the display apparatus.

According to some embodiments, the frequency of the second vertical synchronization signal VSYNC2 is less than the frequency of the vertical synchronization signal VSYNC so that the power consumption to detect the dropout of the stabilization capacitor CS may be reduced.

The data driver 500 may output a second vertical synchronization enable signal VSYNC2_EN representing an activation of the second vertical synchronization signal VSYNC2 to the touch driver 600.

According to some embodiments, the dropout of the stabilization capacitor (e.g., CS or CS1 and CS2) of the touch driver 600 may be detected using the mixing signal MS generated by mixing the periodic signal (e.g., VSYNC2) to the touch power voltage AVDD. The dropout of the stabilization capacitor (e.g., CS or CS1 and CS2) of the touch driver 600 may be electrically detected so that the detectability may be significantly increased compared to visually inspecting the dropout of the stabilization capacitor (e.g., CS or CS1 and CS2).

In addition, the periodic signal (e.g., VSYNC2) in the display apparatus is used to detect the dropout of the stabilization capacitor without additional noise generating apparatus or equipment so that the dropout of the stabilization capacitor (e.g., CS or CS1 and CS2) of the touch driver 600 may be detected without increasing the manufacturing cost of the display apparatus.

Figure 13:
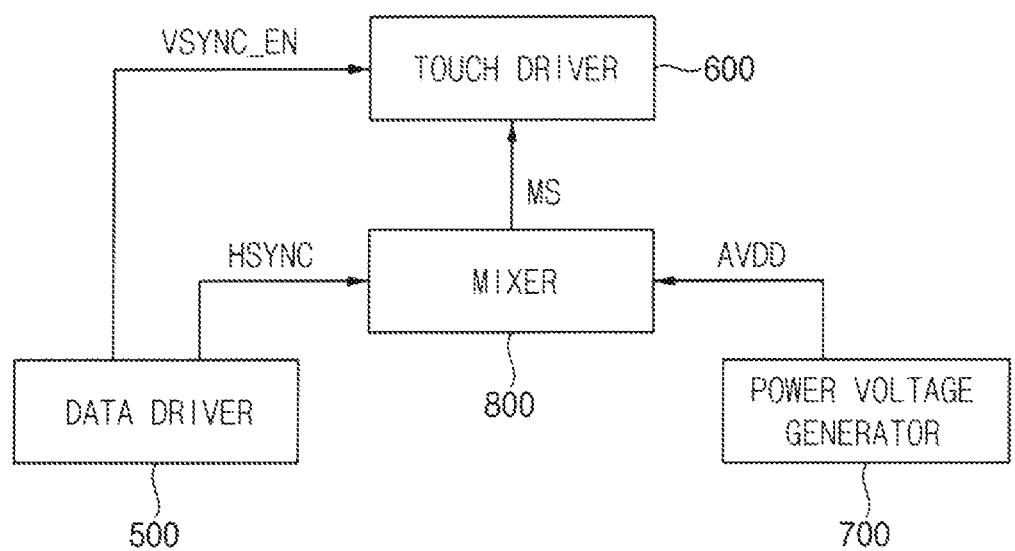
FIG. 13 is a block diagram illustrating operations of a data driver, a touch driver, a power voltage generator and a mixer of a display apparatus according to some embodiments of the present inventive concept.

FIG. 13 is a block diagram illustrating operations of a data driver 500, a touch driver 600, a power voltage generator 700 and a mixer 800 of a display apparatus according to some embodiments of the present inventive concept.

The display apparatus according to some embodiments as illustrated in FIG. 13 may be substantially the same as the display apparatus of the previous embodiments described with respect to FIGS. 1 to 10 except for the periodical signal. Thus, the same reference numerals will be used to refer to the same or like parts as those described in the previous example embodiments described with respect to FIGS. 1 to 10 and some repetitive explanation concerning the above elements may be omitted.

Referring to FIGS. 1, 3 to 10 and 13, the display apparatus includes a display panel 100 and a display panel driver. The display panel driver includes a driving controller 200, a gate driver 300, a gamma reference voltage generator 400 and a data driver 500.

The display apparatus may further include a touch driver 600 to recognize a touch of the display panel 100. The display apparatus may further include a power voltage generator 700 generating a touch power voltage AVDD of the touch driver 600.

The display apparatus may further include a mixer 800 mixing the touch power voltage AVDD and a periodical signal (e.g., HSYNC) to generate a mixing signal MS in a test mode (the second mode) and outputting the mixing signal MS to the touch driver 600.

In a normal mode (the first mode), the touch driver 600 may receive the touch power voltage AVDD.

As shown in FIG. 3, a peripheral circuit of the touch driver 600 may include a first switch SW1 including a first end receiving the touch power voltage AVDD and a second end connected to an output node of the mixer 800, a second switch SW2 including a first end receiving the touch power voltage AVDD and a second end connected to a first input terminal of the mixer 800, a third switch SW3 including a first end receiving the periodical signal (e.g., HSYNC) and a second end connected to a second input terminal of the mixer 800, a first pull up resistor RP including a first end connected to the output node of the mixer 800 and a second end connected to the touch driver 600 and the stabilization capacitor CS including a first end connected to the output node of the mixer 800 and a second end connected to a ground.

When the stabilization capacitor CS is not dropped out and the touch power voltage AVDD including the noise component is applied to the touch driver 600, the touch power voltage AVDD from which the noise component is removed may be inputted into the touch driver 600. In contrast, when the stabilization capacitor CS is dropped out and the touch power voltage AVDD including the noise component is applied to the touch driver 600, the touch power voltage AVDD including the noise component may be inputted into the touch driver 600.

According to some embodiments, the periodical signal may be a horizontal synchronization signal HSYNC corresponding to a horizontal period of an image. The horizontal period may represent a period when the data voltage is applied to a single horizontal line of the display panel 100. The horizontal synchronization signal HSYNC may be outputted from the data driver 500 to the mixer 800. For example, the horizontal synchronization signal HSYNC may be generated by the driving controller 200 and may be outputted from the driving controller 200 to the data driver 500 with the data signal DATA. The horizontal synchronization signal HSYNC may have a frequency greater than an input frequency of the input image data IMG.

The data driver 500 may output a vertical synchronization enable signal VSYNC_EN representing an activation of a vertical synchronization signal VSYNC to the touch driver 600.

According to some embodiments, the dropout of the stabilization capacitor (e.g., CS or CS1 and CS2) of the touch driver 600 may be detected using the mixing signal MS generated by mixing the periodic signal (e.g., HSYNC) to the touch power voltage AVDD. The dropout of the stabilization capacitor (e.g., CS or CS1 and CS2) of the touch driver 600 may be electrically detected so that the detectability may be significantly increased compared to visually inspecting the dropout of the stabilization capacitor (e.g., CS or CS1 and CS2).

In addition, the periodic signal (e.g., HSYNC) in the display apparatus is used to detect the dropout of the stabilization capacitor without additional noise generating apparatus or equipment so that the dropout of the stabilization capacitor (e.g., CS or CS1 and CS2) of the touch driver 600 may be detected without increasing the manufacturing cost of the display apparatus.

Figure 14:
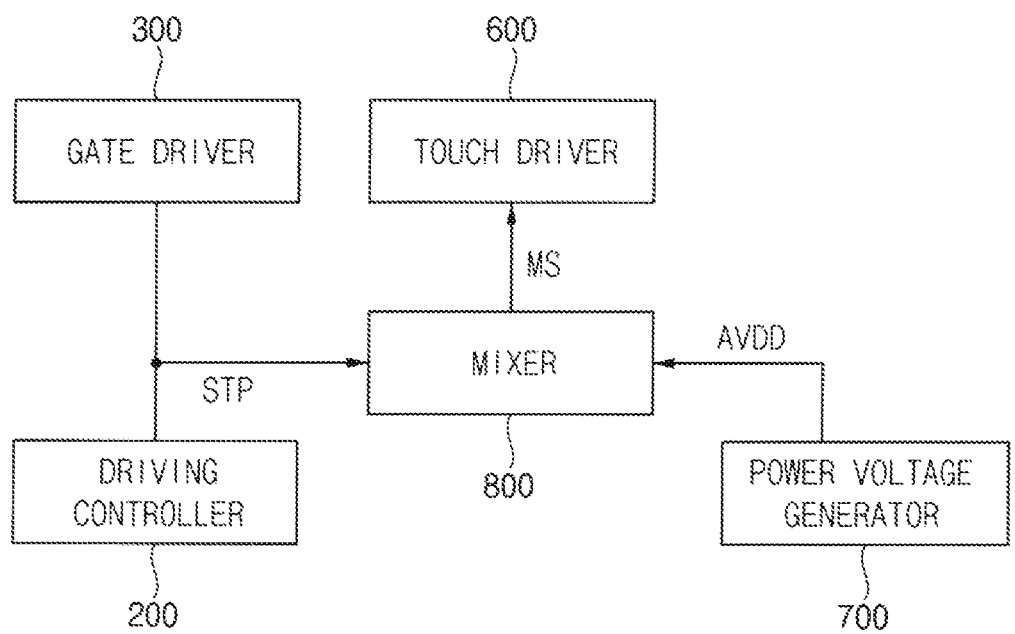
FIG. 14 is a block diagram illustrating operations of a driving controller, a gate driver, a touch driver, a power voltage generator and a mixer of a display apparatus according to some embodiments of the present inventive concept.

FIG. 14 is a block diagram illustrating operations of a driving controller 200, a gate driver 300, a touch driver 600, a power voltage generator 700 and a mixer 800 of a display apparatus according to some embodiments of the present inventive concept.

The display apparatus according to the embodiments described with respect to FIG. 14 may be substantially the same as the display apparatus of the previous embodiments described with respect to FIGS. 1 to 10 except for the periodical signal. Thus, the same reference numerals will be used to refer to the same or like parts as those described in the previous example embodiments of FIGS. 1 to 10 and some repetitive explanation concerning the above elements may be omitted.

Referring to FIGS. 1, 3 to 10 and 14, the display apparatus includes a display panel 100 and a display panel driver. The display panel driver includes a driving controller 200, a gate driver 300, a gamma reference voltage generator 400 and a data driver 500.

The display apparatus may further include a touch driver 600 to recognize a touch of the display panel 100. The display apparatus may further include a power voltage generator 700 generating a touch power voltage AVDD of the touch driver 600.

The display apparatus may further include a mixer 800 mixing the touch power voltage AVDD and a periodical signal (e.g., STP) to generate a mixing signal MS in a test mode (the second mode) and outputting the mixing signal MS to the touch driver 600.

In a normal mode (the first mode), the touch driver 600 may receive the touch power voltage AVDD.

As shown in FIG. 3, a peripheral circuit of the touch driver 600 may include a first switch SW1 including a first end receiving the touch power voltage AVDD and a second end connected to an output node of the mixer 800, a second switch SW2 including a first end receiving the touch power voltage AVDD and a second end connected to a first input terminal of the mixer 800, a third switch SW3 including a first end receiving the periodical signal (e.g., STP) and a second end connected to a second input terminal of the mixer 800, a first pull up resistor RP including a first end connected to the output node of the mixer 800 and a second end connected to the touch driver 600 and the stabilization capacitor CS including a first end connected to the output node of the mixer 800 and a second end connected to a ground.

When the stabilization capacitor CS is not dropped out and the touch power voltage AVDD including the noise component is applied to the touch driver 600, the touch power voltage AVDD from which the noise component is removed may be inputted into the touch driver 600. In contrast, when the stabilization capacitor CS is dropped out and the touch power voltage AVDD including the noise component is applied to the touch driver 600, the touch power voltage AVDD including the noise component may be inputted into the touch driver 600.

According to some embodiments, the periodical signal may be a vertical start signal STP representing a start of a scanning of the gate driver 300. The vertical start signal STP may represent a start of the frame. For example, the frequency of the vertical start signal STP may be same as the input frequency of the input image data IMG. The gate driver 300 may include stages respectively outputting the gate signals to the respective gate lines. The stages may output the gate signals to the gate lines in a shift register style using a carry signal. Herein, a first stage is not able to receive a carry signal from a previous stage so that the first stage may receive the vertical start signal STP.

According to some embodiments, the vertical start signal STP may be outputted from the driving controller 200 to the mixer 800. Alternatively, the vertical start signal STP may be outputted from the gate driver 300 to the mixer 800.

According to some embodiments, the dropout of the stabilization capacitor (e.g., CS or CS1 and CS2) of the touch driver 600 may be detected using the mixing signal MS generated by mixing the periodic signal (e.g., STP) to the touch power voltage AVDD. The dropout of the stabilization capacitor (e.g., CS or CS1 and CS2) of the touch driver 600 may be electrically detected so that the detectability may be significantly increased compared to visually inspecting the dropout of the stabilization capacitor (e.g., CS or CS1 and CS2).

In addition, the periodic signal (e.g., STP) in the display apparatus is used to detect the dropout of the stabilization capacitor without additional noise generating apparatus or equipment so that the dropout of the stabilization capacitor (e.g., CS or CS1 and CS2) of the touch driver 600 may be detected without increasing the manufacturing cost of the display apparatus.

Figure 15:
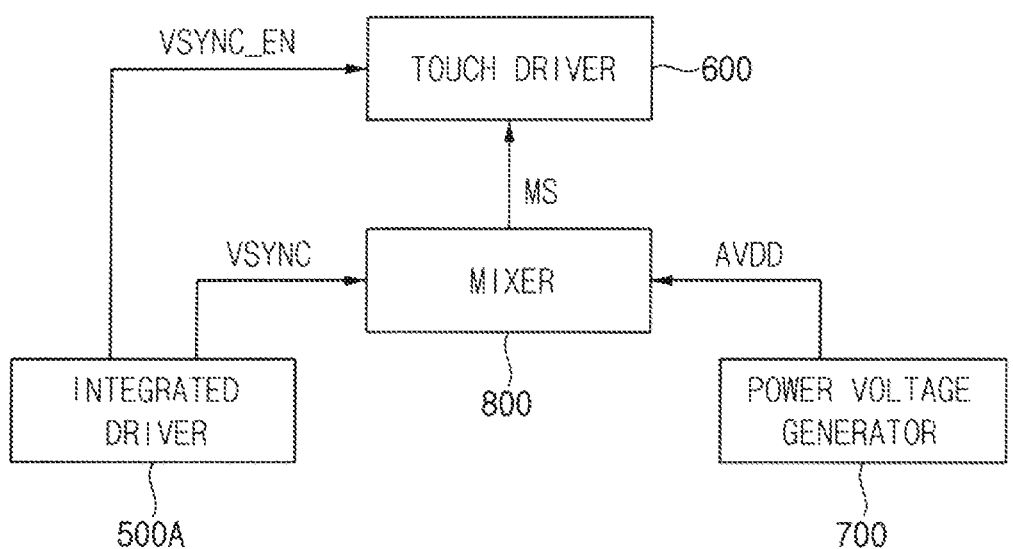
FIG. 15 is a block diagram illustrating operations of an integrated driver, a touch driver, a power voltage generator and a mixer of a display apparatus according to some embodiments of the present inventive concept.

FIG. 15 is a block diagram illustrating operations of an integrated driver, a touch driver, a power voltage generator and a mixer of a display apparatus according to some embodiments of the present inventive concept.

The display apparatus according to the embodiments described with respect to FIG. 15 may be substantially the same as the display apparatus of the previous embodiments explained referring to FIGS. 1 to 10 except that the data driver is formed as the integrated driver. Thus, the same reference numerals will be used to refer to the same or like parts as those described in the previous example embodiments of FIGS. 1 to 10 and some repetitive explanation concerning the above elements may be omitted.

Referring to FIGS. 1, 3 to 10 and 15, the display apparatus includes a display panel 100 and a display panel driver. The display panel driver includes a driving controller 200, a gate driver 300, a gamma reference voltage generator 400 and a data driver 500. According to some embodiments of the present inventive concept, the driving controller 200 and the data driver 500 may be integrally formed so that the driving controller 200 and the data driver 500 may form the integrated driver 500A.

The display apparatus may further include a touch driver 600 to recognize a touch of the display panel 100. The display apparatus may further include a power voltage generator 700 generating a touch power voltage AVDD of the touch driver 600.

The display apparatus may further include a mixer 800 mixing the touch power voltage AVDD and a periodical signal (e.g., VSYNC) to generate a mixing signal MS in a test mode (the second mode) and outputting the mixing signal MS to the touch driver 600.

In a normal mode (the first mode), the touch driver 600 may receive the touch power voltage AVDD.

As shown in FIG. 3, a peripheral circuit of the touch driver 600 may include a first switch SW1 including a first end receiving the touch power voltage AVDD and a second end connected to an output node of the mixer 800, a second switch SW2 including a first end receiving the touch power voltage AVDD and a second end connected to a first input terminal of the mixer 800, a third switch SW3 including a first end receiving the periodical signal (e.g., VSYNC) and a second end connected to a second input terminal of the mixer 800, a first pull up resistor RP including a first end connected to the output node of the mixer 800 and a second end connected to the touch driver 600 and the stabilization capacitor CS including a first end connected to the output node of the mixer 800 and a second end connected to a ground.

When the stabilization capacitor CS is not dropped out and the touch power voltage AVDD including the noise component is applied to the touch driver 600, the touch power voltage AVDD from which the noise component is removed may be inputted into the touch driver 600. In contrast, when the stabilization capacitor CS is dropped out and the touch power voltage AVDD including the noise component is applied to the touch driver 600, the touch power voltage AVDD including the noise component may be inputted into the touch driver 600.

According to some embodiments, the periodical signal may be a vertical synchronization signal VSYNC corresponding to a start point of a frame of an image. The vertical synchronization signal VSYNC may be outputted from the integrated driver 500A to the mixer 800. The integrated driver 500A may synchronize the vertical synchronization signal VSYNC and the data signal DATA. When an input frequency of the input image data IMG is 60 Hz, the vertical synchronization signal VSYNC may have a frequency of 60 Hz. According to some embodiments, the integrated driver 500A may output a vertical synchronization enable signal VSYNC_EN representing an activation of the vertical synchronization signal VSYNC to the touch driver 600.

According to some embodiments, the dropout of the stabilization capacitor (e.g., CS or CS1 and CS2) of the touch driver 600 may be detected using the mixing signal MS generated by mixing the periodic signal (e.g., VSYNC) to the touch power voltage AVDD. The dropout of the stabilization capacitor (e.g., CS or CS1 and CS2) of the touch driver 600 may be electrically detected so that the detectability may be significantly increased compared to visually inspecting the dropout of the stabilization capacitor (e.g., CS or CS1 and CS2).

In addition, the periodic signal (e.g., VSYNC) in the display apparatus is used to detect the dropout of the stabilization capacitor without additional noise generating apparatus or equipment so that the dropout of the stabilization capacitor (e.g., CS or CS1 and CS2) of the touch driver 600 may be detected without increasing the manufacturing cost of the display apparatus.

According to the display apparatus and the method of detecting the dropout of the stabilization capacitor of the touch driver using the display apparatus of the present inventive concept, the dropout of the stabilization capacitor of the touch driver may be detected using the mixing signal generated by mixing the periodic signal to the touch power voltage so that the detectability may be enhanced and the manufacturing cost may not be increased.

The foregoing is illustrative of the present inventive concept and is not to be construed as limiting thereof. Although aspects of some embodiments of the present inventive concept have been described, those skilled in the art will readily appreciate that many modifications are possible in the embodiments without materially departing from the novel teachings and characteristics of embodiments according to the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:
   a display panel configured to display an image;
   a data driver configured to output a data voltage to a data line of the display panel;
   a touch driver configured to identify a touch input to the display panel;
   a power voltage generator configured to generate a touch power voltage; and
   a mixer configured to mix a periodical signal to the touch power voltage to generate a mixing signal and configured to provide the mixing signal to the touch driver in a test mode.

2. The display apparatus of claim 1, wherein the touch driver is configured to receive a touch power voltage in a normal mode.

3. The display apparatus of claim 2, further comprising:
   a first switch including a first end configured to receive the touch power voltage and a second end connected to an output node of the mixer;
   a second switch including a first end configured to receive the touch power voltage and a second end connected to a first input terminal of the mixer;
   a third switch including a first end configured to receive the periodical signal and a second end connected to a second input terminal of the mixer;
   a first pull up resistor including a first end connected to the output node of the mixer and a second end connected to the touch driver; and
   a stabilization capacitor including a first end connected to the output node of the mixer and a second end connected to a ground.

4. The display apparatus of claim 3, wherein a first switch signal applied to the first switch has an active level and a second switch signal applied to the second switch and a third switch signal applied to the third switch have an inactive level in a turn on period of the normal mode.

5. The display apparatus of claim 3, wherein a first switch signal applied to the first switch has an inactive level and a second switch signal applied to the second switch and a third switch signal applied to the third switch have an active level in a test period of the test mode.

6. The display apparatus of claim 1, wherein the periodical signal is a vertical synchronization signal corresponding to a start point of a frame of the image, and
   wherein the data driver is configured to output the vertical synchronization signal to the mixer.

7. The display apparatus of claim 6, wherein the data driver is configured output a vertical synchronization enable signal representing an activation of the vertical synchronization signal to the touch driver.

8. The display apparatus of claim 1, wherein in response to an input frequency of the image being a first frequency, the periodical signal is a second vertical synchronization signal having a second frequency less than the first frequency, and
   wherein the data driver is configured to output the second vertical synchronization signal to the mixer.

9. The display apparatus of claim 1, wherein the periodical signal is a horizontal synchronization signal corresponding to a horizontal period of the image, and
   wherein the data driver is configured to output the horizontal synchronization signal to the mixer.

10. The display apparatus of claim 1, further comprising:
    a gate driver configured to apply a gate signal to a gate line of the display panel; and
    a driving controller configured to control a timing of the gate driver and a timing of the data driver,
    wherein the periodical signal is a vertical start signal representing a start of a scanning of the gate driver, and
    wherein the driving controller is configured to output the vertical start signal to the mixer.

11. The display apparatus of claim 1, further comprising:
    a gate driver configured to apply a gate signal to a gate line of the display panel; and
    a driving controller configured to control a timing of the gate driver and a timing of the data driver,
    wherein the data driver and the driving controller are integrally formed to form an integrated driver,
    wherein the periodical signal is a vertical synchronization signal corresponding to a start point of a frame of the image, and
    wherein the integrated driver is configured to output the vertical synchronization signal to the mixer.

12. A method of detecting a dropout of a stabilization capacitor of a touch driver, the method comprising:
   generating a touch power voltage;
   mixing a periodical signal to the touch power voltage to generate a mixing signal;
   providing the mixing signal to the touch driver in a test mode; and
   detecting the dropout of the stabilization capacitor of the touch driver based on an input mixing signal which is the mixing signal after inputted into the touch driver.

13. The method of claim 12, wherein in response to the input mixing signal having a periodical signal component, the stabilization capacitor of the touch driver is determined to be dropped out, and
   wherein in response to the input mixing signal not having the periodical signal component, the stabilization capacitor of the touch driver is determined not to be dropped out.

14. The method of claim 12, wherein the touch driver is configured to receive the touch power voltage in a normal mode.

15. The method of claim 14, wherein a peripheral circuit of the touch driver comprises:
   a first switch including a first end configured to receive the touch power voltage and a second end connected to an output node of a mixer;
   a second switch including a first end configured to receive the touch power voltage and a second end connected to a first input terminal of the mixer;
   a third switch including a first end configured to receive the periodical signal and a second end connected to a second input terminal of the mixer;
   a first pull up resistor including a first end connected to the output node of the mixer and a second end connected to the touch driver; and
   a stabilization capacitor including a first end connected to the output node of the mixer and a second end connected to a ground.

16. The method of claim 15, wherein a first switch signal applied to the first switch has an active level and a second switch signal applied to the second switch and a third switch signal applied to the third switch have an inactive level in a turn on period of the normal mode.

17. The method of claim 15, wherein a first switch signal applied to the first switch has an inactive level and a second switch signal applied to the second switch and a third switch signal applied to the third switch have an active level in a test period of the test mode.

18. The method of claim 12, wherein the periodical signal is a vertical synchronization signal corresponding to a start point of a frame of an image, and
   wherein a data driver is configured to output the vertical synchronization signal to a mixer.

19. The method of claim 12, wherein the periodical signal is a horizontal synchronization signal corresponding to a horizontal period of an image, and
   wherein a data driver is configured to output the horizontal synchronization signal to a mixer.

* * * * *